March 11, 1947.  R. M. SMITH  2,417,136
RADIO PULSE ECHO SYSTEM
Filed March 18, 1940
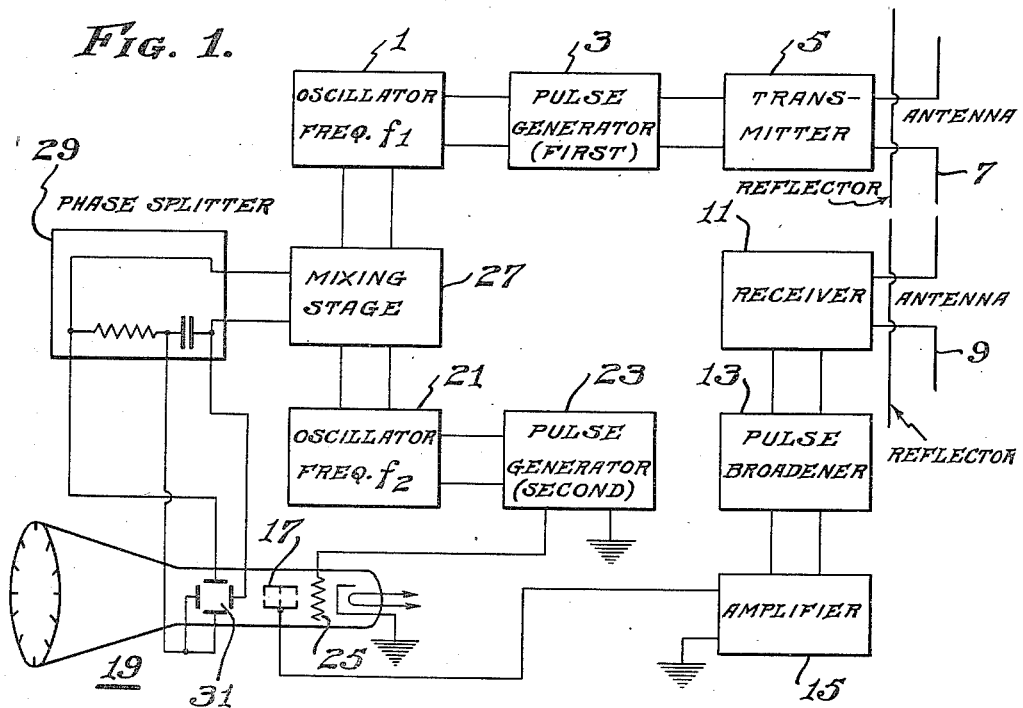
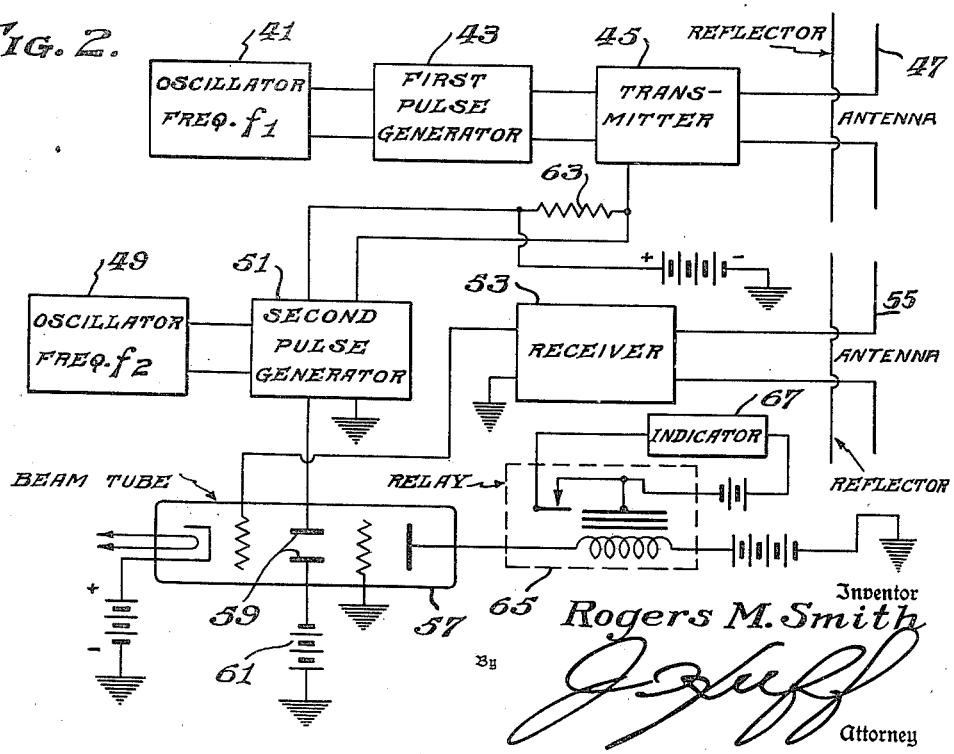
Inventor
Rogers M. Smith
By
Attorney Patented Mar. 11, 1947

2,417,136

UNITED STATES PATENT OFFICE 2,417,136

RADIO PULSE ECHO SYSTEM

Rogers M. Smith, Merchantville, N. J., assignor to Radio Corporation of America, a corporation of Delaware Application March 18, 1940, Serial No. 324,709

6 Claims. (Cl. 250—1.66)

1

This invention relates to a radio pulse echo system and more especially to a radio pulse echo system for distance indication in which the indicator is keyed at a continuously variable phase so that the reflected echoes are indicated only when their reception coincides with the keying of the indicator.

Rieber U. S. Patent No. 1,988,020, describes a radio pulse echo system in which a strong initial pulse of one frequency is radiated toward a wave reflecting object, and after an interval a weaker pulse of another frequency is generated. The interval is varied by means of a manual control, until the two pulses coincide at the receiver. The receiver is responsive to the difference frequency, in the manner of a superheterodyne, so that coincidental reception is indicated by the beating frequency which is detected in the usual manner. Thus the difference in time between the initial pulse and the second pulse indicates the difference in the lengths of the paths taken by the two pulses, which both travel at the same velocity.

While Rieber does not describe a continuously operating device for indicating simultaneously a plurality of echoes from objects located at different distances from the transmitter, a modification of the Rieber system has been disclosed in the copending application, Serial No. 196,863, for "Distance and direction(al) determination system," filed March 19, 1938, by Irving Wolff. In the modified system the local oscillator of a superheterodyne receiver is keyed at a continuously variable phase so that the reflected pulses beat with the local oscillator to form a difference frequency current. The difference frequency current is demodulated and applied to an indicator, which continuously and simultaneously indicates reflections from objects at different distances from the transmitter. In effect the variable phasing of the local oscillator keying corresponds to a synchronous operation of the variable interval controlling means of Rieber and of a visual indicator operated in conjunction with Rieber's receiver.

Under certain conditions, difficulties are experienced with the modified Rieber System. Among these difficulties are (1) the actuation of the receiver by the reception of the initial pulse, (2) the actuation of the receiver by the keying of the local oscillator, (3) the actuation of the receiver by the keying of the local oscillator and one or more amplifier stages, (4) the actuation of the receiver by static or like signals, and (5) keying the receiver requires substan-

2 tial amounts of power. These difficulties might be classified generally as reception by shock excitation or by the application of transient currents which include frequencies within the response range of the receiver.

It is an object of this invention to provide means for indicating distance or for indicating a wave reflecting object by means of a radio pulse echo system. Another object is to provide means for operating a distance measuring system in which the indicator is keyed on at a continuously variable phase. Another object is to provide in a radio pulse echo system means for keying on one portion of the system with respect to another without establishing undesired transient effects.

The invention will be described by referring to the accompanying drawing in which Figure 1 is a circuit diagram representing one embodiment of the invention; and Figure 2 is a schematic diagram of a modification of the invention.

Referring to Fig. 1 an oscillator I of frequency $f1$ is connected to a pulse generator 3. The pulse generator is connected to a transmitter 5 whose output is applied to a directive antenna 7. A second antenna 9 is connected to a receiver II. The output of the receiver is applied, through a pulse broadener 13, to an amplifier 15. The output of the amplifier 15 is impressed on the anode 17 of a cathode ray tube 19.

A second oscillator 21 of frequency $f2$ is connected to a second pulse generator 23. The output of the pulse generator 23 is impressed on the control grid 25 of the cathode ray tube. The first and second oscillators I, 21 are also coupled to a mixing stage 27. The output of the mixing stage is applied to a phase splitter 29, which is in turn connected to the deflecting elements 31 of the cathode ray tube 19.

The operation of the system is as follows: The first oscillator, generating alternating currents of frequency $f1$, controls the pulse generator which develops one sharply defined pulse per positive peak of the oscillator. These pulses are applied to key on the transmitter, which radiates sharply defined pulses of radio frequency energy at the rate determined by the first oscillator frequency $f1$. The radiated pulses after reflection are received, detected or demodulated, broadened, amplified and applied to the anode 17 of the cathode ray tube.

The second oscillator 21 is generating alternating currents of a frequency $f2$, which is different from the frequency of the first oscillator. The currents of frequencies $f1$ and $f2$ are combined in the mixing stage 27 to form an alternating current whose frequency is equal to the difference frequency $f2-f1$. The current of difference frequency is divided into two phases by the phase splitter 29. The two phased currents, applied to the deflecting electrodes, rotate the cathode ray at a rate equal to the difference frequency.

The second oscillator 21 controls the operation of the second pulse generator 23 so that sharply defined pulses are generated for each positive peak of the alternating currents applied thereto. The last mentioned pulses occur at a continuously variable phase with respect to the pulses from the first pulse generator. Furthermore, the pulses from the second pulse generator "key on" the cathode ray tube at continuously different phases. If the reflected signal is being applied to the cathode ray tube, it will cause the rotating cathode ray to be deflected radially at a point in its circular excursion which corresponds to the difference in the interval between the radiation of an outgoing pulse and its reception after reflection. Since the velocity of transmission is known, the indicator may be calibrated as a function of distance.

The foregoing operation should not be confused with the pulse echo distance systems in which the cathode ray movement is operated at a very rapid rate determined by the time required for the radio waves to travel twice the distance to be measured. The instant method is more advantageous in that the difference frequency or relative phase may be adjusted so that an object at a particular distance may be scanned. Furthermore, the system with the rapid ray movement is responsive to static and other interfering effects which are not continuously applied in the present system. Finally, in the present system transient effects are avoided because there is no reactive effect in keying on and off the cathode ray indicator, and because no keying currents with their undesired transients are applied to the receiver.

It should be understood that the invention may be applied to a mechanically rotated indicator of the type disclosed in Fig. 1 of the above mentioned Wolff application. In such an application, the keying pulses are not applied to the local oscillator but are applied to key on and off the pulse broadener, or amplifier if the latter is used, connected to the neon indicator.

In Fig. 2, the circuit of an alarm signal is shown. The transmitter, which includes an oscillator 41, a first pulse generator 43, a transmitter 45 and an antenna 47 corresponds to the previously described transmitter 1, 3, etc. The receiving system which includes an oscillator 49, second pulse generator 51, receiver 53 and antenna 55 corresponds to the previously described receiving system. The output of the receiver is applied to the control grid of a beam tube 57. The deflecting plates 59 of the beam tube are connected to a biasing battery 61 and to the second pulse generator 51. The second pulse generator is connected to a resistor 63 which is included in the power circuit of the transmitter. The output of the beam tube is applied to a sensitive relay 65, which controls an alarm, or indicator 67.

The operation of the arrangement of Fig. 2 corresponds to that of Fig. 1 as far as the transmission and reception of pulses is concerned. Instead of indicating distance, as is done with the system of Fig. 1, the present device is used to indicate a reflecting object. The beam tube is normally biased off but is keyed on at intervals at a frequency $f2$ which is different from the transmitter frequency $f1$. During the transmitter pulse, the second pulse generator is keyed off so that the directly received pulses will not operate the indicator. When the received reflected pulse and the pulse from the second pulse generator coincide, the beam tube and associated relay are operated and the alarm is given. If it is desired that alarm and distance indications be obtained simultaneously, the circuits of Figs. 1 and 2 may be readily combined.

No detailed description of the oscillators, pulse generators, transmitter, receiver, pulse broadener, mixing stage, phase splitter or cathode ray tube are necessary as these elements are well known to those skilled in the art. The pulse broadener, which may be a gaseous discharge tube, may be omitted although it is preferable to integrate the pulses to increase the illumination. The mixing stage may be a conventional radio frequency detector.

I claim as my invention:

1. A radio pulse echo system including means for transmitting pulses of radio frequency energy at a known rate, means for generating pulses of radio frequency energy at a rate different from said transmission rate, means for receiving and demodulating said transmitted pulses after reflection, said demodulating means including an output circuit for said demodulated pulses, an indicator including an electron beam tube having at least two control elements, means coupling one of said control elements of said tube to said demodulating means output circuit for applying said demodulated pulses to said tube, means coupling an element of said tube to said pulse transmitting means, and means connecting said pulse generating means to the other of said control elements of said indicator tube so that said indicator is made operable to indicate said received demodulated pulses at a continuously varying phase with respect to said known rate.

2. A radio pulse echo system including means for transmitting pulses of radio frequency energy at a constant rate, means for receiving and demodulating said transmitted pulses after reflection, said demodulating means including an output circuit for said demodulated pulses, a normally inoperative indicator including an electron beam tube having at least two ray intensity control elements, means coupling one of said control elements of said tube to said demodulating means output circuit for applying said demodulated pulses to said tube, and means coupled to the other of said control elements of said tube for keying on said indicator at a phase varying with respect to said constant rate.

3. A radio pulse echo system including means for transmitting pulses of radio frequency energy at a constant rate, means for receiving and demodulating said transmitted pulses after reflection, said demodulating means including an output circuit for said demodulated pulses, a normally inoperative indicator including a cathode ray tube having at least two cathode ray intensity control electrodes and two ray deflection elements, means connected to said deflection elements for providing deflection of the cathode ray of said tube, means coupling one of said control electrodes of said tube to said demodulating means output circuit for applying said demodulated pulses to said tube, and means coupled to the other of said control electrodes of said tube for making said cathode ray tube operable at a constantly varying phase with respect to said constant transmitter pulse rate.

4. A radio pulse echo system including in combination a radio pulse transmitter, means for pulsing said transmitter at a fixed frequency, means for receiving and demodulating said transmitted pulses after reflection, a normally inoperative indicator including a cathode ray tube having at least two cathode ray intensity control electrodes and two ray deflection elements, means coupling one of said control electrodes of said tube to said demodulating means for applying said demodulated pulses to said tube, means for generating currents of frequency different than said fixed frequency, means for applying said currents to the other of said control electrodes of said tube to key on said indicator at a constantly varying phase with respect to said fixed frequency, means for obtaining deflection currents having a frequency corresponding to the difference in said first and different frequencies, and means for applying said deflection currents to said deflection elements of said tube to operate said indicator so that the distance of objects reflecting said transmitted pulses may be indicated.

5. A radio pulse echo system including in combination a radio pulse transmitter, said transmitter being arranged to transmit pulses of radio frequency energy at a fixed rate, a radio pulse receiver for receiving and demodulating said transmitted pulses after reflection, said receiver being arranged for continuous operation, a normally inoperative cathode ray tube indicator, said tube having at least two cathode ray intensity control electrodes and two ray deflection elements, means for applying potentials to one of said control electrodes at a frequency rate different from said fixed rate, means for applying said demodulated pulses to the other of said control electrodes, means for deriving currents of a frequency equal to the difference in said first and second mentioned rates, and means for applying said last mentioned currents to said deflecting elements to rotate said cathode ray at said different frequency.

6. The method of measuring distances by means of a pulse echo system including a normally inoperative indicator including an electron beam tube having two beam intensity control electrodes, said method comprising generating a first current of one frequency, transmitting pulses as a function of said frequency, receiving and demodulating said pulses after reflection from an object whose distance is to be measured, applying said demodulated pulses to one of said control electrodes of said tube, generating a second current of different frequency, applying said second current to the other of said tube control electrodes for keying on said indicator at intervals corresponding to a function of said second frequency, combining said first and second currents to obtain a current of a frequency corresponding to the difference frequency, and indicating said distance as a function of the phase of said difference frequency current and the coincidence of said keying on and said received pulses.

ROGERS M. SMITH.

REFERENCES CITED

The following references are of record in the file of this patent:

UNITED STATES PATENTS

| Number | Name | Date |
| --- | --- | --- |
| 1,988,020 | Rieber | Jan. 15, 1935 |
| 2,011,392 | Bentley | Aug. 13, 1935 |